Patented Sept. 30, 1947

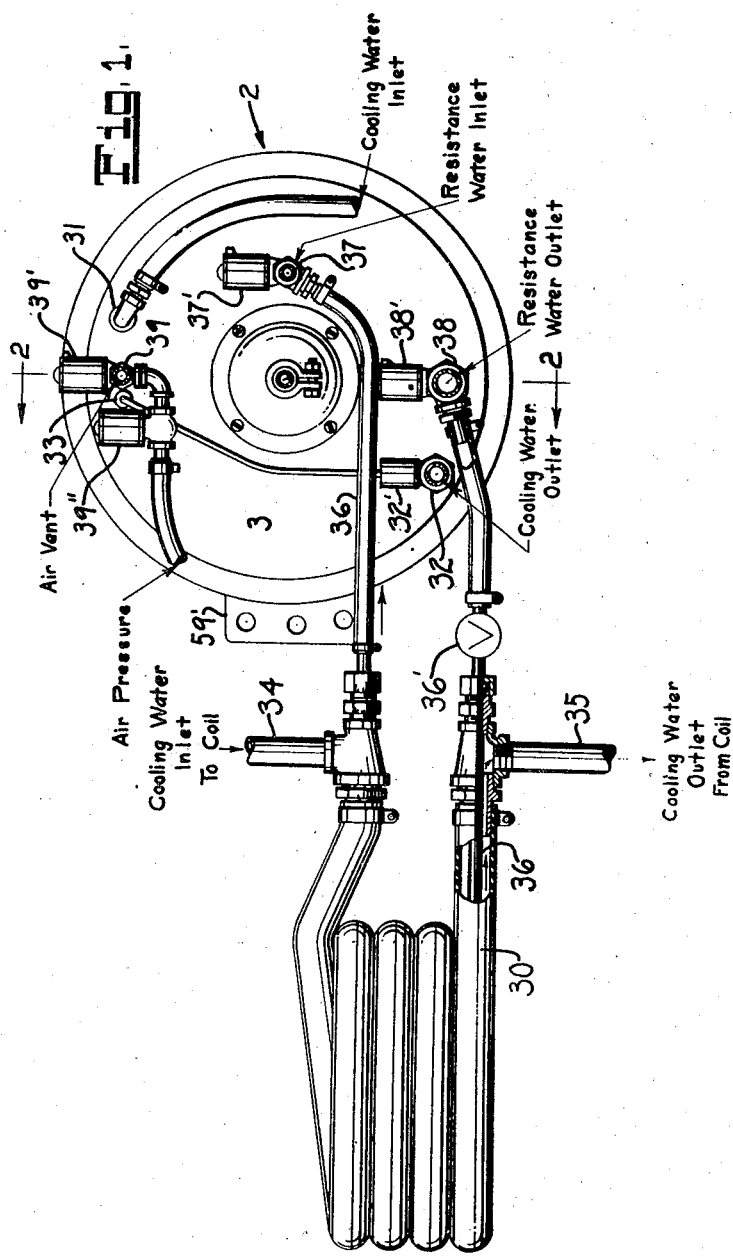

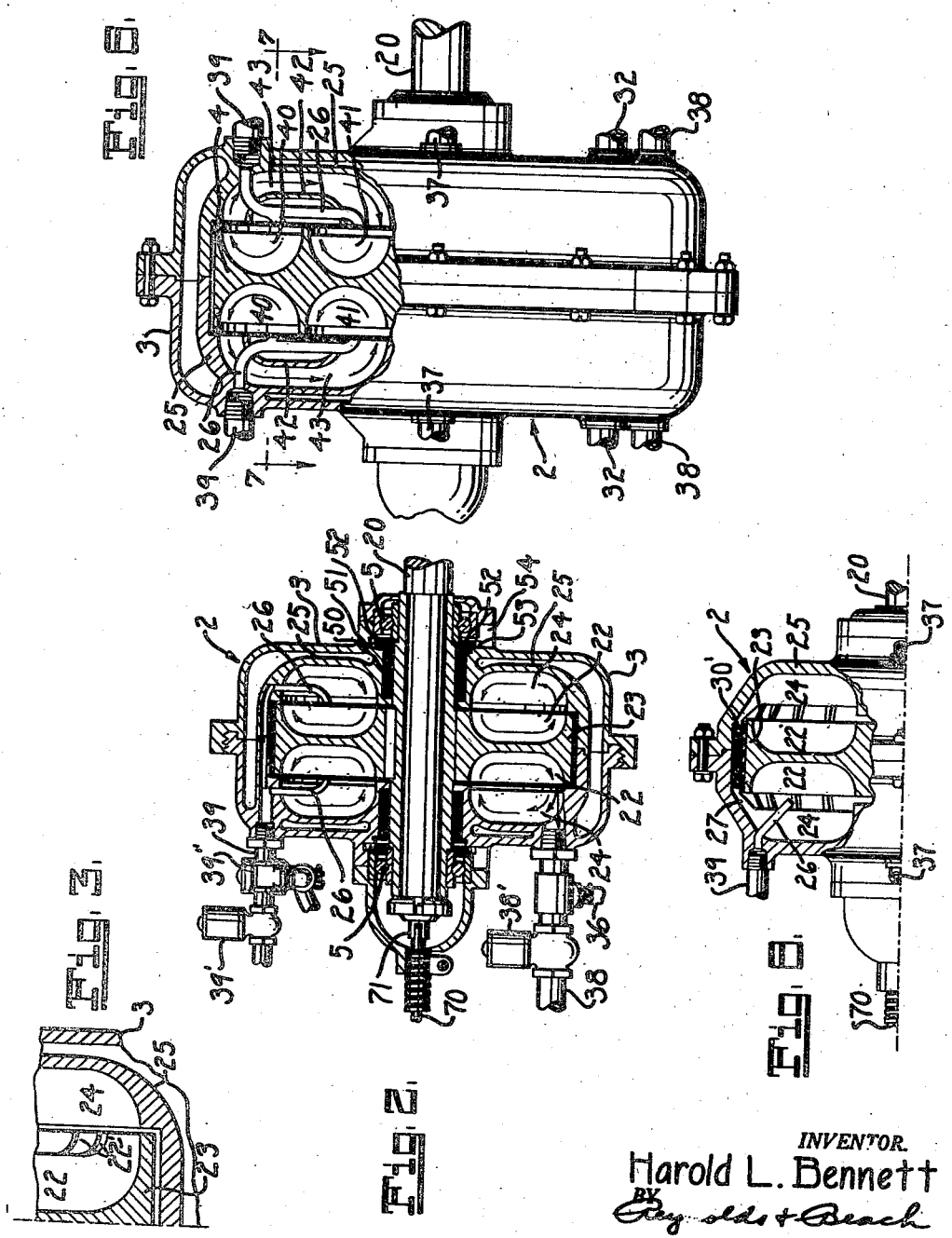

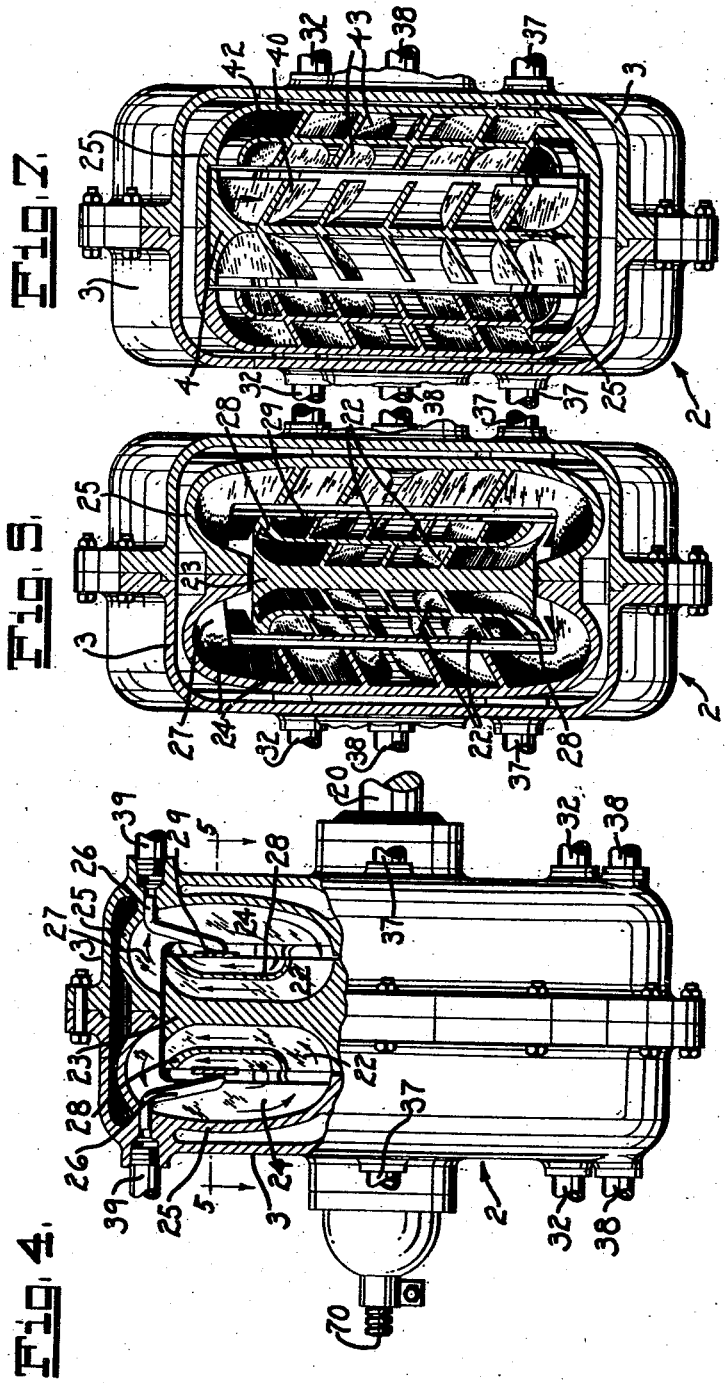

2,428,005

UNITED STATES PATENT OFFICE 2,428,005

DYNAMOMETER

Harold L. Bennett, South Bend, Ind., assignor, by mesne assignments, to Bennett-Feragen, Inc., Seattle, Wash., a corporation of Washington Application February 19, 1941, Serial No. 379,581

13 Claims. (Cl. 188—90)

My invention relates to a dynamometer for testing the power and performance of a motor vehicle under varying conditions of load and speed.

My machine provides mechanism for accurately measuring in a motor vehicle the power output, the instantaneous load, and the speed of both the engine and driving wheels of the motor vehicle for various road speeds while the vehicle itself is stationary. A particular advantage of my equipment is that the load under which the tests are made may be maintained constant without attention on the part of the operator over a long period of time, or, on the other hand, the load may be either increased or decreased very rapidly. Another advantage of importance is the ability to measure power factors at low rates of speed.

In general a dynamometer unit is connected to the vehicle by cradling the driving wheels of the vehicle between two pairs of rolls, or by direct connection of its engine to the rotor of the dynamometer, in either case in known manner. The rolls connect to the rotor of a dynamometer unit, the casing or stator of which contains liquid, such as water, in a greater or less amount, depending upon the load under which the vehicle test is to be conducted. This liquid is sealed in the turbine chamber of the dynamometer and churned between its rotor and stator vanes. The smaller the rolls and the larger the dynamometer unit the greater will be the resistance to wheel rotation which can be established. The power absorbed by the water confined in the dynamometer turbine chamber during this churning action, which ordinarily would generate enough heat to turn the water into steam, is removed by heat transfer through the walls, to cooling water flowing through a jacket surrounding or associated with the turbine chamber. Since water may be used both inside and outside the chamber, that inside, and absorbing power, may be termed the resistance fluid, to distinguish it from the cooling fluid in the outer jacket. The two fluids are maintained separate and distinct.

My object is to provide a dynamometer which can be operated over a long and indefinite period of time at constant load without attention on the part of the operator, or which can be operated at a given load, then stopped, and thereafter again started, and which will then operate under the same load without any adjustment being required. On the other hand, the load under which the test is made can be increased or decreased easily and accurately during operation of the machine, and the newly established load will then remain constant indefinitely for any given speed.

Figure 1 is a side elevation view of the dynamometer unit, and Figure 2 is a sectional view taken on line 2—2 of Figure 1. Figure 3 is a fragmentary section showing a slightly different construction.

Figure 4 shows a modified form of dynamometer unit in elevation, parts thereof being broken away, while Figure 5 is a section taken on line 5—5 of Figure 4.

Figure 6 is an elevation view of a still further form of dynamometer unit, showing parts broken away, and Figure 7 is an annular section taken on line 7—7 of Figure 6.

Figure 8 is a partial section showing a different form of dynamometer.

As stated above, the dynamometer resistance unit 2 is driven by or from the engine of the automobile, by means not herein shown, but conventional. The shaft 20 may be considered the driving means, to transmit torque from the engine to the dynamometer 2, which is connected to one end of the shaft. The opposite end of this shaft may be provided with a coupling for direct connection to an engine to be tested which is not in an automotive vehicle.

The dynamometer unit 2 may be of the hydraulic turbine type, such as shown in Figures 1 to 8. One of the principal divadvantages of such a unit heretofore has been the inability of the operator to maintain conditions which would afford a constantly uniform resistance to vehicle wheel rotation. In such units the resistance to rotation is created by the churning of a liquid, usually water, between the vanes 22 of a rotor 23 and the oppositely inclined vanes 24 of a stator 25, which are somewhat spaced axially from the rotor vanes, to create resistance and absorb power. Naturally this resistance tends to slow down the vehicle wheels. The energy of rotation is transmitted to the resistance liquid as violent agitation, resulting in toroidal circulation, which mechanical action is transformed into heat. The liquid capacity of these units even when filled is small, and ordinarily they are operated only partially filled.

The violent agitation of such a small amount of water in the confined space of the turbine chamber would ordinarily cause it to heat quite rapidly, so that after a couple of minutes of dynamometer operation it would be boiling. In order to prevent this action it has been customary heretofore to provide a continuous flow of water through the turbine or resistance chamber of the dynamometer, but it has been difficult to control the inflow and outflow so that they would be exactly equal, and as a result it has not been possible to maintain constant during a test the quantity of water acted upon, and hence the resistance to rotation would vary. Lowering of pressure in low pressure areas conduces to vaporization of the liquid, with consequent changes in volume and elasticity. A small increase in volume is actually a large percentage of increase, because the total volume is always small. Moreover, if by patiently manipulating the inflow and outflow valves the resistance is maintained fairly uniform during a given test, it has been almost impossible to duplicate that resistance throughout a subsequent test for comparative purposes. Viscosity, relative percentages of liquid water and vapor or steam, and like factors, all vary as a function of varying temperature and uniformity of results has seemed impossible.

I have overcome this difficulty by dividing my dynamometer unit into two compartments, one an internal resistance compartment including a vaned rotor and a vaned stator, as described, in which a small amount of resistance liquid is placed, as determined by the resistance desired, and surrounding this is an outer casing 3 spaced from the stator 25 to constitute a cooling water jacket, and entirely out of communication with the interior of the resistance compartment. Between the jacket wall and the stator a continuous current of cooling water flows, of whatever volume and at whatever flow rate that may be necessary. Thus while the quantity of resistance water being churned by the rotor is maintained precisely constant by sealing the turbine chamber and any communicating chambers, to afford uniform torque, excessive heating of it is prevented because its heat is conducted through the stator walls to the cooling water which continually removes the heat from the unit, and which is sufficient in volme to keep the temperature stabilized at a low value.

The manner in which water is supplied to the internal resistance or turbine compartment is best shown in Figure 1. The water inlet 37 from a supply source to the turbine chamber is preferably located about midway between the top and bottom of the unit and is controlled by a solenoid valve 37', while the chamber outlet 38 is near the bottom of the stator side wall, and is likewise controlled by a solenoid valve 38'. Under normal operating conditions it will be understood that the solenoid valves 37' and 38' will be in closed position so that no water is flowing through the resistance chamber of the unit.

When it is desired to supply water to this chamber or to increase the amount therein, for increased resistance, the solenoid valve 37' is opened to allow water to flow in tangentially of the toroidal circulation through the inlet 37. Simultaneously a vent connection 39, controlled by a solenoid valve 39', will be opened. To this vent leads an internal tube 26 which opens at the axis of the toroidal water whirl between the rotor blades 22 and stator blades 24 where the air is trapped. The air thus removed may be replaced by inflowing water without resistance, instead of compression of trapped air retarding its entrance and the volume of air thus compressed reducing the water capacity of the unit. Because air is allowed to escape freely through the venting connection 39, an increase in the water content of the turbine chamber may be produced at the greatest possible rate. Despite the large volume of inflowing water, the location of the water inlet 37, at the inward end of the turbine cusps, as shown best in Figure 4, enables it to enter the turbine chamber in a single stream without appreciable shock. It has previously been considered necessary to bleed it through a large number of small holes distributed around the stator, but I have found that it may be delivered in one or two large stream if directed tangentially into the inward portion of the toroidal space between stator and rotor vanes.

When, on the other hand, it is desired to decrease the quantity of water in the turbine chamber to lower the resistance to rotation, solenoid valve 38' is operated to open the outlet 38. Since the outlet has in prior dynamometers been connected to the bottom of the stator at its center, only gravity exerted a force to expel the water. Even when a very large opening was provided, therefore, this flow was not rapid because of the small head available. I prefer to keep the outlet fairly small because of the cooling jacket arrangement, but I am able to increase greatly the rate of outflow by location of the outlet 38 at the bottom of the stator side and axially of the turbine chamber, though tangentially of the toroidal whirl. Water is thus discharged from the periphery of the toroidal whirl directly into the end of the outlet conduit, thus producing a powerful pumping action. I may even supplement this pumping action, if desired, by providing a second air solenoid valve 39" which controls flow of gas, such as air, under pressure through the connection 39 and tube 26 into the central portion of the turbine chamber. This compressed air will assist in driving the water out of the outlet 38, so that a considerable decrease in the resistance created by the unit can be made very quickly. The degree of pressure under which the air is supplied will, of course, determine to a large extent the rapidity with which the water may be forced out. If, instead of supplying gas under pressure, valve 39" is an automatic vacuum relief valve, valve 39', instead of being positively operated, may be merely an automatic pressure relief valve. This latter valve may be set to open at a pressure five or ten pounds above atmospheric pressure, so that within this range both such air valves will remain closed.

In general, therefore, when it is desired to increase the quantity of water within the turbine chamber for increasing the rotative resistance, both water inflow solenoid valve 37' and air vent valve 39' will be opened. Conversely, when it is desired to decrease the amount of water in this chamber for lowering the resistance to rotation, water outlet solenoid valve 38' and air pressure inlet valve 39" are both moved to open position. In each case, of course, the length of time and the extent to which one or the other of these water control valves will be left open will depend on the amount of change, either increase or decrease, desired in the resistance of the unit.

A further difficulty in the use of hydraulic dynamometers has been that insufficient resistance to rotation, even with the turbine chamber full of water, was developed by one of small size, particularly at low speeds. I have found that by my novel vane arrangement the resistance to low speed rotation and to rotation at all speeds can be increased materially. In Figure 2, for example, it will be observed that while the rotor and stator vanes are spaced apart axially an appreciable distance, the peripheries of the rotor sides are solid, and are disposed close to solid portions of the stator. The stator vanes terminate radially inward of the solid annular portion adjacent to the rotor periphery. When the water circulates toroidally in the direction of the arrows shown in this figure, therefore, that thrown by centrifugal force from the rotor vanes impinges upon the radially outer ends of the stator vanes to create resistance instead of being thrown into an unvaned hollow in the stator, as in previous constructions. Sufficient axial spacing between the edges of the stator and rotor vanes to prevent merely shearing the water between rotor and stator can be afforded either by setting back the edges of the stator vanes, as shown in Figure 2, or of the rotor vanes as shown in Figures 3 and 6, to leave stator or rotor flanges, respectively, or by setting back a smaller distance the edges of both the stator and rotor vanes to leave narrow flanges on both. In Figure 3, while the greater portion of each vane is set back from the peripheral flange plane, the outer end of each vane has a tab 22' extending axially as far as the flange.

Another way in which the turbulent interference of the water between the rotor and stator may be improved, to increase the resistance to rotation, is by the construction of Figures 4 and 8, in which the inclined stator vanes 24 include portions 27 (in Figure 4) extending radially outward alongside the rotor beyond its periphery, and thence in an axial direction, though still inclined, past the nearer side face of the rotor and adjacent its periphery toward or to its central portion. Where such a stator is used a rotor like that in Figure 2 may be employed, as shown in Figure 8. However, in the arrangement shown in Figure 4, no marginal flange projecting beyond the plane of the rotor vane edges will be required because the water discharged from its periphery is thrown against the stator vane extensions 27. In Figure 8 the extensions 27' are similar to the extensions 27 of Figure 4, but the rotor vanes 22 do not to the same extent discharge radially.

On the other hand, very good results may be obtained by using the partitioned rotor of Figure 4, from which the water is discharged through ports in its periphery. The extent of the stator vane extensions 27 in such case will preferably, as shown, be greater both radially outward and axially toward the center. Even here, however, it is not necessary that such extensions meet at the center plane of the rotor for the water has an axial component of movement away from this plane. In the rotor of Figure 4, between adjacent vanes 22 are disposed partitions 28 extending generally perpendicular to the rotor's axis of rotation. Such partitions, as shown, divide the rotor passages, between adjacent vanes 22, into axially inner and outer groups. The axially inner groups discharge through the peripheral face of the rotor against the extensions 27 of the stator vanes. Because the radiating vanes 22 are spaced wider at the periphery of the rotor than towards the center, the partitions 28 are located to define a wide central inlet opening and a relatively narrow peripheral discharge opening, so that the cross section of the outlet port will not be appreciably larger than the inlet port. In fact, as shown in Figure 4, the restriction at the outlet in an axial direction may be even greater, the partitions and the rotor disk 23 converging axially to such a degree that a discharge opening of smaller cross-sectional area than the rest of the passage will be formed. As centrifugal force impels the water outward through these passages, therefore, the restricted discharge port will produce a nozzle effect, increasing the velocity of the water leaving the rotor, so that the resistance resulting from its impact against the stator blade extensions will be greater than would otherwise be the case.

Where partitions 28 are employed generally concentric circulating toriodal orbits are formed, and to facilitate formation of the smaller orbit rings 29 may be secured to the opposite sides of the rotor. A partition similar to 28 may be provided in the stator section, such as illustrated in Figure 6, which will be described in detail hereafter. While it is convenient to consider this circulation of water as following the same path over and over, actually this is not the case, for the rotation of the rotor with respect to the stator cannot be ignored. Actually such circulation is only one vector of the water's movement, its travel from rotor to stator and back accomplishing also a large movement circumferentially of the rotor.

To the cooling jacket 3 is a water connection 31, which need not be controlled by a valve since the flow through the cooling jacket may be governed entirely by a solenoid valve 32' controlling the outlet 32 from the jacket. Opening and closing of this valve may be effected by an electric thermoswitch, or, on the other hand, the degree of opening of valve 32' may be regulated by a thermostat, either such thermo control 33 being located in the upper part of the jacket to which the hot water would naturally rise, or in the turbine chamber or its communicating conduits. Since it is desirable to keep all parts of the unit at as nearly a uniform temperature as possible, however, the cold water inlet 31 is preferably located at the top of the unit, while the outlet 32 is at the bottom. Such arrangement provides a circulation of cooling water opposed to its normal convection tendency as it is heated, so that the cooling water throughout the jacket is kept thoroughly mixed continuously, and hence a substantially uniform temperature throughout the jacket is maintained. While I prefer this arrangement, in some cases it may be more desirable to supply the cooling water through the lower connection 32 and to leave the upper connection 31, which becomes the outlet, freely open so that the jacket will be kept full at all times. The valve 32' would then control the water inflow instead of its discharge. Alternatively the valve 32 might be placed in connection 31 when used as the outlet, the pressure supply communicating freely with the jacket through conduit 32.

It will be understood that for units of smaller size or smaller resistance the heat generated in the turbine chamber may be removed through the walls 25 by the cooling water in the jacket 3 sufficiently rapidly to keep the temperature of the resistance chamber water from rising excessively. For dynamometers of the larger sizes, when greater heat dissipating capacity is required, however, it may be necessary, at least when being operated under nearly full load, to employ a supplemental heat exchange unit such as illustrated in Figure 1. Alternatively such an accessory cooler may replace the jacket in small dynamometers, or the cooling fluid coil may lie circumferentially within the stator, as shown at 30' in Figure 8, where the coils, such as of copper tubing, are mutually spaced apart and spaced from the rotor periphery sufficiently to allow water in the turbine chamber to flow between them. The connections to such a coil will be similar to the jacket connections previously described. The accessory unit of Figure 1 includes an inner tube 36, which forms part of the circulating path for the resistance water, surrounded by a cooling fluid hose 30. As shown, the ends of tube 36 are connected to the main inlet and outlet conduits 37 and 38, respectively, between their control valves and the turbine chamber. This tube, as the coils 30', may be of suitable heat transfer material, such as soft copper, and the hose may be of rubber or rubberized fabric, so that the composite conduit can be coiled to constitute a heat exchange unit of considerable length which will occupy only a small space. A control valve 36' may be provided for this cooling coil, which may be of either the manual, solenoid, or thermostatic type, to interrupt or limit the flow. If such a valve is fully closed the supplemental device is operatively disconnected. The unit may readily be physically disconnected, if desired, and the connections in the intake 37 and outlet 38 in the dynamometer plugged. The size, number, and shape of the convolutions of coil 30', or of tube 36 and encircling hose 30 required will depend principally on the heat which must be dissipated.

Water would flow from the turbine chamber into the supplemental cooler through the outlet connection 38, in the direction of the arrow shown in Figure 1, and the force exerted upon the water by the rotating rotor urging it toward this outlet connection, as previously described, will serve as a pump to force the water through the inner conduit and back into the inlet 37 near the center of the turbine chamber. The cooling water for this outer conduit is preferably entirely separate from that flowing through the jacket, and its flow may be continuous at a manually controlled rate, leaving the thermostat 33 to control the amount of additional cooling effected by water flowing through the jacket. For best cooling efficiency the cooling water will flow through the hose 30 in the direction opposite to the flow of the turbine chamber water through pipe 36. Thus the cooling water will normally enter through a connection 34, and after it has been heated it will be discharged through connection 35. When the supplemental unit is used it will be understood that no change other than its connection need be made in the dynamometer, and it may be rendered inoperative at any time merely by closing valve 36', either at will or by the effect of a temperature drop, as previously mentioned. By the pumping action of the whirling rotor described above the pipe 36 will be kept filled at all times, so that its capacity may be merely added to that of the turbine chamber, but its presence or absence will not affect, one way or the other, the resistance created by the amount of water actually in the turbine chamber.

Another problem arises in cooling units of the larger sizes. The water in the water jacket can only dissipate heat which has been conducted to it through the walls of the rotor chamber 25. Naturally such conduction can only take place when the water comes into contact with this wall. Where a large quantity of heat must be dissipated, therefore, it is desirable that the resistance water, within the turbine chamber, circulate methodically so that all parts of the water content flow regularly along the wall separating the two chambers.

A construction of turbine rotor and stator blades is shown in Figure 6 which will accomplish such a circulation by guiding movement of the water through radial paths. The rotor 4 in this instance is provided with two concentric annular rows of cups, each cup being of semi-cylindrical shape, whose axis extends generally circumferentially of the rotor. The outer row of cups 40 is quite near the periphery, and is separated from the inner row of cups 41 by only a thin annular rib or partition of generally cusp shape, which projects beyond the rotor vane edges into close proximity to the edges of the stator vanes 43. A peripheral rotor flange extending axially outward substantially as far as the central rib and encircling the rotor vanes also lies close to the stator beyond the radially outer ends of its vanes. The leading and trailing ends of each cup are parallel, but are inclined with respect to the axis of its generating cylinder, as shown in Figure 7 where the outer wall of the unit has been broken away.

The stator, between its radiating fins, has a circumferentially extending partition 42 generally parallel to the outer wall of the turbine chamber 25. The radially outer edge of this partition turns toward the center of the unit to terminate at the inner surface of the stator between the top and bottom of the outer row of cups 40. The radially inner edge of this partition is curved inwardly to the inner surface of the stator between the radially outer and inner edges of the inner circle of cups 41. Such partition ends will preferably be radially outward from the center of the cups to compensate for the flare of the passages between the radial partitions, so that the cross-sectional area of these passages will be nearly uniform over their whole lengths. The intermediate portions of these partitions are disposed in a plane perpendicular to the shaft 20, and substantially midway between the stator casing 25 and its inner face adjacent to the rotor. The radial vanes 43 of the stator are inclined substantially parallel with the fins of the rotor so that as the latter turns in the direction indicated by the arrow a resistance will be created by the churning effect produced. In addition, however, centrifugal force will cause the water to flow radially outwardly along the curved surface of the two cups 40 and 41 into the outer and inner stator chambers, respectively, as indicated by the arrows. The water in the outer section, driven by water flowing in from behind, will move inward into the radially inner side of the cup 41. The water discharged from this cup into the inner stator chamber will move radially outward into the radially inner portion of cup 40. The air tubes 26 in this construction should have openings at the center of both outer and inner pockets.

A stator and rotor construction of this type has three principal advantages, resulting in increased resistance being produced by a unit of a given size, and improved heat dissipating characteristics. The first advantage is that a positive flow circuit radially of the unit, as well as circumferentially, is established, which eliminates any relatively dead spots in the center of the orbit, as might occur with the construction of Figure 2. Thus all the water is being moved at a substantially uniform rate, so that it is all acting with greatest efficiency to produce resistance. The second effect is that resistance is increased by reason of the triple abrupt reversal of movement of the water during its circuit. The first such reversal occurs between the flow of water into the radially inner portion of cup 41 from the outer stator chamber and its flow out of the radially outer portion of cup 41 into the inner stator chamber. The second reversal of flow direction is through the inner stator chamber between the entrance of the water into it from the radially outer portion of cup 41, and its flow out of this chamber into the radially inner portion of cup 40. The third reversal of movement occurs, of course, between the inflow to cup 41 and the outflow from its radially outer portion into the outer stator chamber. An additional reversal of direction not included in the above description necessarily occurs during passage through the outer stator chamber, but this is not an abrupt reversal of direction, as are the other three mentioned, and hence its effect in increasing the resistance is relatively slight. The third advantage of this structure is that during each circuit along the path described all the water is compelled to flow closely along the heat interchange wall 25 separating the turbine chamber from the water jacket, so that the jacket water will most effectively remove the heat from the water circulating in the turbine chamber by conduction through such wall.

I have described the circulation through the rotor cups 40 and 41 and the stator chambers formed by partition 42 as though a given body of water were circulating continually through the course described. This does not give a true picture of the action, of course, for the rotor cups 40 and 41 are moving rapidly in a circumferential direction, while the stator chambers are stationary. Moreover, such circumferential movement is necessary to produce the centrifugal force required to effect such circulation. Actually, therefore, water would be received by a given set of rotor cups 40 and 41 from certain stator chambers formed by vanes 43 and a partition 42, and this same water would be discharged into a different set of stator chambers, circumferentially spaced from the first in the direction of advance of such particular rotor pockets. The movement of the water is a combination of turbulence created by relative circumferential movement of the radial fins on the stator and rotor and of the radially outward and inward circulation between the rotor and stator pockets, as above described. The particular action of the water will, of course, vary with the speed of rotation, and with the quantity of water in the turbine chamber, but the two factors of vane interference and circulation between stator and rotor will always be present.

The structural details of my turbine unit may vary considerably, although the general arrangement and method of operation may be practically the same. Nevertheless, certain of such features of construction I consider to be important. One of these is the manner in which the rotor shaft is mounted in the housing of the unit and packed. Antifriction bearings 5, which may be of the ball or roller bearing type, must be lubricated and kept practically free from water if they are to operate satisfactorily at high speeds. A long packing space is therefore provided about the shaft 20 as shown in Figure 2, which is filled with packing 50. Such packing may be of any expansible type pressed tightly into the annular recess and held in place by a retainer ring 51.

Despite the provision of a long chamber thus filled with compressed packing, a small amount of water may leak through, especially after the machine has been in use for some time. Consequently I provide between the packing retainer ring 51 and the bearing 5 a scavenging or throw ring 52 preferably of larger diameter than the packing retaining ring. As water seeps through the packing, therefore, its axial movement will be interrupted by ring 52, and as the water seeks to move around this ring it will be flung radially outward into a collecting groove 53 about the ring, from which it will flow out through a discharge port 54 in the bottom of the bearing housing before it comes into contact with the bearing 5. Even the smallest amount of water which may penetrate the packing material will thus be moved in advance of the shaft bearing by this centrifugal action.

Another structural advantage of my machine is the ease with which the two halves can be assembled. While the water jacket is provided with flanges which can be bolted together in the conventional way, as shown in Figure 4, I prefer that one of the flanges be formed with a female thread, and the other flange with a male thread, as shown in Figure 2, so that the two halves of the unit, after insertion of the rotor, may merely be screwed together. An interfitting construction of the two casing halves, such as a plain rabbeted joint, may be provided to seal the water jacket from the turbine chamber, as well as to seal the water jacket exteriorly. Any suitable connection may be provided on the unit casing for attachment to a torque arm. Normally this would be a bolting flange 59' as shown in Figure 1, to which would be fastened the torque arm 59. The tendency of the stator to rotate is transmitted to an instrument (not shown) for indicating the amount of resistance created by the dynamometer unit.

What I claim as my invention is:

1. A dynamometer comprising a stator defining a turbine chamber, and formed with a plurality of generally radially disposed vanes, a rotor received within the stator and also having generally radially disposed vanes cooperating with the stator vanes to produce numerous toroidal whirls, an outlet for flow of liquid from the turbine chamber, a valve controlling positively flow of liquid through such outlet, and means communicating with the toroidal axis of said whirls to supply gas under pressure for forcible expulsion of liquid through said outlet, when said valve is open.

2. A dynamometer of the liquid resistance type, comprising a stator defining a turbine chamber, a rotor received therein, cooperating vanes on the stator and rotor, a liquid inlet to the turbine chamber and a liquid outlet therefrom separate from said inlet, an air port, separate valve means for said inlet and outlet to control positively liquid inflow and outflow through the respective ports, and means associated with the air port to selectively control outflow or inflow of air, correspondingly as the liquid volume within the turbine chamber is increased or decreased, respectively.

3. A dynamometer comprising a stator defining a turbine chamber, and formed with a plurality of generally radially disposed vanes, a rotor received within the stator and also having generally radially disposed vanes cooperating with the stator vanes to produce numerous toroidal whirls, an outlet for flow of liquid from the turbine chamber, a valve controlling positively flow of liquid through such outlet, means communicating with the toroidal axis of said whirls to supply gas under pressure for forcible expulsion of liquid through said outlet, when said valve is open, means to cut off the gas pressure supply and to vent the toroidal axis of the whirls, and a valved liquid inlet to the turbine chamber, to supply liquid thereinto at a rate controlled by the opening of the vent and of the liquid inlet.

4. A dynamometer of the liquid resistance type, comprising a stator member defining a turbine chamber and having generally radial vanes, a rotor member within said chamber having complemental, generally radial vanes, the vanes in one such member being divided by a partition disposed generally perpendicular to the axis of rotation, to define two separate circulation channels, and the vanes in the other such member being divided by a partition disposed generally in an axial direction, located between the radial inward and outward ends of the first partition, to define an inner and an outer series of cups each cooperating with the rsepective circulation channels in the first member.

5. The combination of claim 4, wherein the partition perpendicular to the axis is formed in the stator.

6. The combination of claim 4 wherein the partition perpendicular to the axis is formed in the stator and the axial partition is formed in the rotor and projects axially toward the stator a substantial distance beyond the edges of the rotor vanes.

7. A dynamometer of the liquid resistance type, comprising a stator member defining a turbine chamber, and having generally radial vanes, a rotor member received in said turbine chamber having generally radial vanes cooperating with said stator vanes, and partition means disposed generally perpendicular to the rotor's axis of rotation extending between the vanes in one of said members over a major portion of their radial length and defining with said vanes axially inner and outer passages for fluid flow therethrough.

8. A dynamometer of the liquid resistance type, comprising a stator member defining a turbine chamber, and having generally radial vanes, a rotor member received in said turbine chamber having generally radial vanes cooperating with said stator vanes, and a partition disposed generally annularly between adjacent vanes of one of said members intermediate their radially inner and outer ends, the vanes on the other member being unrestricted in the vicinity of said annular partition for free radial flow of fluid therebetween.

9. A dynamometer of the liquid resistance type, comprising a stator defining a turbine chamber, and having generally radial vanes, a rotor received in said turbine chamber having generally radial vanes cooperating with said stator vanes, the major portion of the adjacent edges of the cooperating rotor and stator vanes being spaced apart axially a substantial distance, and the rotor and stator vanes being relatively closely spaced axially at the periphery of said rotor.

10. A dynamometer of the liquid resistance type, comprising a stator defining a turbine chamber, and having generally radial vanes, a rotor received in said turbine chamber having generally radial vanes cooperating with said stator vanes, the major portion of the adjacent edges of the cooperating rotor and stator vanes being spaced apart axially a substantial distance, and the outer ends of said stator vanes extending axially toward the rotor periphery for disposition relatively much closer to the outer ends of said rotor vanes than the spacing between radially inner portions of the rotor and stator vanes.

11. A dynamometer of the liquid resistance type, comprising a stator defining a turbine chamber, a rotor received in said turbine chamber having generally radial vanes, and having a solid rim encircling the radially outer end of said vanes and extending axially toward the stator at least substantially as far as said vanes, on said stator cooperating with said rotor vanes and extending radially outward alongside the rotor beyond its periphery, and thence in an axial direction adjacent to the periphery of said rotor past its nearer side face and toward its central plane.

12. A dynamometer of the liquid resistance type, comprising a stator defining a turbine chamber, and having generally radial vanes, a rotor received in said turbine chamber having generally radial vanes cooperating with said stator vanes, the major portion of the adjacent edges of the cooperating rotor and stator vanes being spaced apart axially a substantial distance, and the outer ends of said rotor vanes extending axially toward the stator beyond radially inner portions thereof for disposition relatively much closer to the stator vanes.

13. A dynamometer of the liquid resistance type, comprising a stator defining a turbine chamber and having fixed vanes, a rotor received in said turbine chamber and having vanes spaced axially from said stator vanes, an inlet conduit communicating with said turbine chamber for supplying liquid thereto, an inlet valve controlling flow therethrough, an outlet from the turbine chamber, an outlet valve controlling flow through the outlet and operable independently of the inlet valve, an air connection having one end located within the turbine chamber adjacent the center of the annular space between said rotor vanes and said stator vanes, air valve means controlling flow of air through said air connection, and valve operating means operable to effect simultaneous operation of said inlet valve and said air valve for simultaneous inflow of liquid to the turbine chamber and outflow of air therefrom, and further operable to effect simultaneous operation of said outlet valve and said air valve means for simultaneous outflow of liquid from the turbine chamber and inflow of air thereto.

HAROLD L. BENNETT.

REFERENCES CITED

The following references are of record in the file of this patent:

UNITED STATES PATENTS

| Number | Name | Date |
|---|---|---|
| 2,130,900 | Presbrey | Sept. 20, 1938 |
| 2,130,833 | Bennett | Sept. 20, 1938 |
| 2,144,010 | Bennett | Jan. 17, 1939 |
| 1,464,763 | Isenberg | Aug. 14, 1923 |
| 1,073,385 | Applequist | Sept. 16, 1913 |
| 2,189,189 | Bennett | Feb. 6, 1940 |
| 2,218,463 | Bennett | Oct. 15, 1940 |
| 1,790,968 | Baulino | Feb. 3, 1931 |
| 2,073,243 | Liddell et al. | Mar. 9, 1937 |
| 2,201,019 | Zotter | May 14, 1940 |
| 2,043,931 | Morgan | June 9, 1936 |
| 2,050,529 | Haskins | Aug. 11, 1936 |
| 2,219,168 | Thomas | Oct. 22, 1940 |
| 838,765 | Bissell | Dec. 18, 1906 |
| 1,743,409 | Tracy | Jan. 14, 1930 |
| 1,915,547 | North et al. | June 27, 1933 |
| 1,922,911 | De La Mater | Feb. 26, 1935 |
| 2,185,491 | Anderson et al. | Jan. 2, 1940 |
| 2,226,412 | Schmidt | Dec. 24, 1940 |
| 1,131,810 | Zoller et al. | Mar. 16, 1915 |
| 2,195,130 | Hoyt | Mar. 26, 1940 |
| 1,881,083 | Kiep | Oct. 4, 1932 |
| 2,141,305 | Kosters | Dec. 27, 1938 |

FOREIGN PATENTS

| Number | Country | Date |
|---|---|---|
| 11,267 | Great Britain | 1911 |
| 504,567 | France | Apr. 17, 1920 |

Certificate of Correction

Patent No. 2,428,005.                                September 30, 1947.

HAROLD L. BENNETT

It is hereby certified that error appears in the printed specification of the above numbered patent requiring correction as follows: Column 11, line 68, claim 11, after the word and comma "vanes," insert *vanes*; and that the said Letters Patent should be read with this correction therein that the same may conform to the record of the case in the Patent Office.

Signed and sealed this 2d day of December, A. D. 1947.

[SEAL]

THOMAS F. MURPHY,
*Assistant Commissioner of Patents.*